United States Patent Office 3,387,059
Patented June 4, 1968

3,387,059
POLYESTERS PREPARED FROM BRANCHED CHAIN MONOCARBOXYLIC ACIDS
Pierre Theodore Camille Pajot, Chantilly, France, assignor to Etablissements Kuhlmann, Paris, France
No Drawing. Filed Dec. 24, 1964, Ser. No. 421,085
Claims priority, application France, Dec. 28, 1963, 958,763
4 Claims. (Cl. 260—842)

ABSTRACT OF THE DISCLOSURE

Polyesters have been prepared using branched aliphatic monocarboxylic acids wherein the carboxyl group is linked directly to a —$CH_2$— group. The polyesters have good chemical resistance and may be blended with aminoplast or phenoplast resins.

---

The present invention concerns improvements in and relating to new synthetic resins.

It is known that the condensation of polycarboxylic acids with polyalcohols leads to the formation of resins, that the resins may be modified by monocarboxylic acids and the esters derived therefrom, and that they then serve as starting materials for the manufacture of varnishes, lacquers, paints and coating materials.

Suitable polycarboxylic acids are, for example the aliphatic diacids such as succinic, adipic, glutaric, citric, maleic, fumaric, itaconic, or citraconic acids or their anhydrides, the aromatic diacids such as ortho, meta or para phthalic acids, trimellic, pyromellic or trimesic acids, or the derivatives of these acids or their anhydrides, the dimerised fatty acids of drying oils, addition compounds of the Diels-Alder type, especially those of maleic acid or maleic anhydride on the terpenes, cyclopentadiene, or hexachloropentadiene.

Suitable polyhydroxy compounds are, for example, glycerol, tris(hydroxymethyl)ethane or tris(hydroxymethyl)propane, butanetriols, hexanetriols, pentaerythritol, sorbitol, polyethylene glycols, their epoxy derivatives, or their mixtures among themselves or with monovalent alcohols.

Suitable monocarboxylic acids, are for example, (1) Aromatic acids such as benzoic acid;
(2) Linear aliphatic acids such as caprylic, lauric, stearic, palmitic, ricinoleic, oleic or linoleic acid;
(3) Branched aliphatic acids in which the carboxylic group is linked directly to a tertiary or quaternary carbon atom.

These acids are obtained by the reaction of a monoethylenic olefine with formic acid or carbon monoxide and water in the presence of acid or metal catalysts.

These branched aliphatic acids provide alkyd resins which give enamels of good hardness, and the resistance of which to chemical agents is superior to that of resins derived from linear acids. They are difficult to esterify, however, and their esterification generally necessitates either the use of a strongly alkaline catalyst and elevated temperatures, a process which gives coloured resins, or the intermediate formation of their glycidyl esters, an operation which is long and expensive.

It has now been discovered that those branched aliphatic monocarboxylic acids in which the —COOH group is linked directly to a —$CH_2$— group can be esterified more easily and provide resins having properties at least equivalent to those of the branched acids in which the —COOH group is linked directly to a tertiary or quaternary carbon atom. They are all particularly good from the point of view of hardness and resistance to basic or acidic chemical agents.

The branched monocarboxylic aliphatic acids in which the COOH group is linked directly to a —$CH_2$— group can be obtained for example by simple oxidation with air of the aldehydes, called ketoaldehydes, prepared by the hydroformylation of olefines. For their technical utilisation, it is not necessary to isolate them in the pure state; they may be used, for example, in the form of mixtures of isomers possibly containing small quantities of acids of different constitution.

Thus, for example, a mixture may be used which is made up essentially of 3-methyl-1-hexanoic acid and 5-methyl-1- hexanoic acid, containing small proportions of 2,4-dimethyl-1-pentanoic acid and obtained by the hydroformylation of 2-methyl-1-pentene followed by oxidation with air of the mixture of aldehyde obtained.

The branched aliphatic monocarboxylic acids in which the —COOH group is linked directly to a —$CH_2$— group can react with polyhydroxy compounds or with the reaction products from polyacids and polyalcohols. The use of these acids does not modify at all the various known processes for obtaining alkyd resins based on monocarboxylic acids. They may be used in admixture with drying or non-drying fatty acids or with aromatic monocarboxylic acids.

The esterification of the branched aliphatic monocarboxylic acids in which the —COOH group is linked directly to a —$CH_2$— group is rapid and does not require elevated temperatures or catalysts, although the latter can be used. These acids may be introduced as a whole into the reactor with the polycarboxy and polyhydroxy compounds, or only a part may be reacted and then the remainder added after inter-esterification of the previously charged compounds. These monocarboxylic acids may be reacted with polyhydroxy compounds and give partial esters which then react with the polycarboxy compounds, a complementary addition of polyhydroxy compounds then being able to be carried out. A certain amount of solvent may be added for the purpose of removing the water formed by the esterification in the form of an azeotrope; the water can be separated by decantation and the solvent recycled. It is advantageous to effect the reaction in an inert atmosphere, that is, in the absence of oxygen, so as to obtain the alkyd resins as clear as possible.

The alkyd resins of this invention may be used with pigments to prepare varnishes, lacquers, paints or coating materials and, if desired, phenoplast or aminoplast resins may be added.

The invention will be more clearly understood by reference to the following examples which are purely illustrative.

Example 1

640 parts of 3-methyl-1-hexanoic acid, 112 parts of ethylene glycol, 482 parts of pentaerythritol, and 762 parts of phthalic anhydride are charged under nitrogen into a reactor equipped in the usual manner, and heated to 200° C. An alkyd resin with an acid value of 11 and the viscosity of which at 20° C. and in a 60% solution in xylene is about 22 poises, is obtained.

Example 2

The mixture of isomeric heptanals obtained by the hydroformylation of 2-methyl-1-pentene is subjected to oxidation in a reactor fitted in its lower part with a porous ceramic filter candle through which air is passed. On progressively raising the temperature from 30° C. to 80° C., a product is obtained from which a heptanoic acid of 99% purity is isolated by fractional distillation. Examination of this mixture of acids by chromatography and infra-red spectrum enables the following composition:

74% of 3-methylhexanoic acid,
22% of 5-methylhexanoic acid,
4% of 2,4-dimethylpentanoic acid.

640 parts of the above mixture of acids, 112 parts of ethylene glycol, 482 parts of pentaerythritol and 763 parts of phthalic anhydride are charged under nitrogen into a reactor, and heated to 200° C. An alkyd resin of acid value 11 and a viscosity at 20° C. in a 60% solution in xylene of about 22 poises is obtained.

The resin obtained is mixed with a butyl urea-formaldehyde resin ("Aminolac ND") in the ratio of 70 parts of the one to 30 parts of the other by weight. The mixture is pigmented in a pigment/resin ratio of 0.7.

The mixture is applied to thin steel plates and they are stoved at 150° C. for 30 minutes. The enamels obtained possess very good hardness and a good resistance to alkaline and acid chemical agents.

Example 3

558 parts of the mixture of acids obtained by the oxidation with air, according to a process analogous to that of the preceding example, of the aldehydes prepared by the hydroformylation of the trimer of propylene are charged under carbon dioxide gas into a reactor with 478 parts of glycerine and 760 parts of phthalic anhydride and are esterified at 220° C. An alkyd resin with an acid value of 9 and a viscosity at 20° C. in 50% solution in xylene of 18 poises is obtained.

The resin obtained is mixed with a butyl urea-formaldehyde resin ("Aminolac ND") in the ratio of 70 parts of the one to 30 parts of the other by weight. The mixture is pigmented in a pigment/resin ratio of 0.7.

The mixture is applied to thin steel plates and they are stoved at 150° C. for 30 minutes. The enamels obtained possess a very good hardness and a good resistance to alkaline and acid chemical agents.

Example 4

350 parts of the mixture of acids obtained by the oxidation with air of the aldehydes prepared by the hydroformylation of propylene trimer are charged under nitrogen into a reactor with 267 parts of glycerine and 403 parts of phthalic anhydride and esterified at 240° C. An alkyd resin with an acid value of 6 and a viscosity at 20° C. in 60% xylene solution of 38 poises is obtained.

Example 5

630 parts of the mixture of acids obtained by the oxidation with air of the aldehydes prepared by the hydroformylation of propylene trimer, 63 parts of benzoic acid, 545 parts of pentaerythritol and 1120 parts of phthalic anhydride are introduced into a reactor under an atmosphere of carbon dioxide gas, and heated to 210° C. The resin obtained has an acid value of 4, and its viscosity at 20% C. and in 55% solution in xylene is 77 poises.

A stoving enamel prepared with 80 parts of this resin, 20 parts of butyl melamine-formaldehyde resin ("Aminolac MI") and 70 parts of titanium oxide is applied to thin steel panels, which are stoved for 30 minutes at 140° C.

The enamel obtained, 48 microns in thickness, has been subjected to various tests, the results being as follows:

Pendular hardness (Persoz) _____ 210.
Erichsen penetration _____ 8 mm.
After heating for 2 hours at 180°
  C. _____ Very slight change of color.
Resistance to sodium hydroxide ____ Good.
Resistance to sulphuric acid _____ Very good.
Resistance to detergents _____ Good.

With an alkyd resin having an acid value of 5 and a viscosity of 79 poises at 20° C. and 55% solution in xylene, prepared by replacing the 630 parts of the mixture of acids by 630 parts of a mixture of lauric and pelargonic acids, the following results are obtained:

Pendular hardness (Persoz) _____ 130.
After heating for 2 hours at 180° C. __ Slight change of color.
Resistance to sodium hydroxide ____ Average.
Resistance to sulphuric acid _____ Satisfactory.

Example 6

700 parts of the mixture of acids obtained by the oxidation with air of the aldehydes prepared by the hydroformylation of propylene trimer are introduced into a reactor under an atmosphere of carbon dioxide gas with 70 parts of benzoic acid, 600 parts of pentaerythritol and 630 parts of phthalic anhydride and are heated to 225° C. The resin obtained has an acid value of 8. Its viscosity at 20° C. and in 55% solution in xylene is 90 poises.

A stoving enamel prepared from 80 parts of this resin, 20 parts of butyl melamine-formaldehyde resin ("Aminolac MI") and 50 parts of titanium oxide is applied to thin panels of passivated steel, and these are stoved for 30 minutes at 140° C.

The enamel obtained, 40 microns in thickness, has been subjected to various tests; the results are as follows:

Pendular hardness (Persoz) _____ 230.
Erichsen penetration _____ 6 mm.
After heating for 3 hours at 180°
  C. _____ Very slight change of color.
Resistance to sodium hydroxide ___ Good.
Resistance to sulphuric acid _____ Very good.
Resistance to detergents _____ Good.

Example 7

A mixture of 303 parts of the mixture of acids obtained by the oxidation with air of the aldehydes prepared by the hydroformylation of propylene trimer, 187 parts of trimethylol propane, 128 parts of glycerine and 382 parts of phthalic anhydride is heated to 235° C. under nitrogen. The resin obtained has an acid value of 7, and its viscosity at 20° C. and in 60% solution in xylene is 10 poises.

Example 8

A mixture of 314 parts of the mixture of acids obtained by the oxidation with air of the aldehydes prepared by the hydroformylation of propylene tetramer, 72 parts of ethylene glycol, 232 parts of pentaerythritol and 380 parts of phthalic anhydride is heated to 200° C. under nitrogen until the acid value is below 10. The resin thus obtained is mixed with a butyl urea-formaldehyde or butyl melamine-formaldehyde resin and enamels are obtained which have good hardness as well as good resistance to acid or basic chemical agents.

Example 9

The mixture of isomeric octanals obtained by the hydroformylation of isomeric heptenes (co-dimer of propylene and butylene) is oxidised as in Example 2. A mixture of isomeric octanoic acids of 98% purity is isolated by fractional distillation, and has the following composition:

10% of methylheptanoic acids,
85% of dimethylhexanoic acids, and
5% of trimethylpentanoic acids, 88% being acids in which the carboxyl group is linked to a —$CH_2$— group (primary acids) and 12% acids in which the carboxyl group is linked to a

group (secondary acids).

295 parts of this mixture of acids, 267 parts of glycerine, and 403 parts of phthalic anhydride are charged into a reactor under nitrogen and are esterified at 220° C. until the acid value is below 10. The resin thus obtained is mixed with a butyl urea-formaldehyde or butyl melamine-formaldehyde resin and enamels are obtained which have good hardness as well as good resistance to acid or basic chemical agents.

I claim:

1. An alkyd resin particularly useful for the preparation of surface coatings having a good hardness and a good resistance to acid and alkaline chemical agents, consisting essentially of the inter-esterification product of at least one member selected from the group consisting of polycarboxylic acids and anhydrides thereof, at least one polyalcohol, and a mixture of alkanoic acids containing more than 70% of 3-alkyl alkanoic acids which consist essentially of 3-methylhexanoic acid with a lower proportion of 5-methylhexanoic acid and 2,4-dimethyl-1-pentanoic acid.

2. The mixtures of alkyd resin according to claim 1 with a member selected from the group consisting of aminoplast and phenoplast resins.

3. An alkyd resin particularly useful for the preparation of surface coatings having a good hardness and a good resistance to acid and alkaline chemical agents, consisting essentially of the inter-esterification product of at least one member selected from the group consisting of polycarboxylic acids and anhydrides thereof, at least one polyalcohol, and a mixture of alkanoic acids containing more than 70% of 3-alkyl alkanoic acids obtained by the oxidation of the aldehydes prepared by the hydroformylation of propylene trimer.

4. The mixture of alkyd resin according to claim 3 with a member selected from the group consisting of aminoplast and phenoplast resins.

References Cited

UNITED STATES PATENTS

| | | | |
|---|---|---|---|
| 2,575,196 | 11/1951 | Smith | 260—76 |
| 2,815,355 | 12/1957 | Hill | 260—530 |
| 2,852,563 | 9/1958 | Hagemeyer et al. | 260—530 |
| 2,920,056 | 1/1960 | Banes et al. | 260—31.6 |
| 2,973,331 | 2/1961 | Kraft | 260—22 |
| 2,871,248 | 1/1959 | Kirkland et al. | 260—488 |
| 2,991,274 | 7/1961 | Carlston et al. | 260—76 |
| 3,042,650 | 7/1962 | Bockstabler | 260—861 |
| 3,123,578 | 3/1964 | Kraft | 260—76 |
| 3,023,185 | 2/1962 | Bastlett et al. | 260—31.6 |
| 3,039,979 | 6/1962 | Carlick et al. | 260—2 |

OTHER REFERENCES

Smith, H. A.: Acid Catalyzed Esterification of Aliphatic Acids, Jour. of Amer. Chem. Soc., vol. 62, pp. 1136–1140 (1940).

MURRAY TILLMAN, *Primary Examiner.*

J. T. GOOLKASIAN, *Assistant Examiner.*